Oct. 24, 1939. J. MUROS 2,177,440
SHAVING IMPLEMENT
Filed May 19, 1937

INVENTOR
Joseph Muros.
BY
ATTORNEY

Patented Oct. 24, 1939

2,177,440

UNITED STATES PATENT OFFICE 2,177,440

SHAVING IMPLEMENT

Joseph Muros, Cambridge, Mass., assignor to Gillette Safety Razor Company, Boston, Mass., a corporation of Delaware Application May 19, 1937, Serial No. 143,565

3 Claims. (Cl. 30—43)

This invention relates to dry-shaving implements employing relatively movable shearing members. Its general object is to improve the efficiency and comfort of such implements. The desired results are brought about by providing a novel mechanical organization effective to prevent the shearing members from becoming clogged with shaving debris, to maintain them at all times in contacting shearing relation without separation, and to eliminate pull by maintaining always a predetermined spacing between the side walls of the shearing elements.

In dry-shaving implements as heretofore constructed, and particularly those having a bridge type of shearing member, the accumulation of shaving debris if not scrupulously removed tends to build up in such a manner as to cause separation of the co-operating shearing faces with the result that the device will shave inefficiently or not at all. Particularly troublesome conditions are encountered in shaving implements having inclined or tapering side walls in their shearing members because under such conditions the shaving debris is packed between these surfaces and tends powerfully to depress the inner movable shearing member by a wedging action. The attempt has been made heretofore to minimize this difficulty by providing an appreciable or excessive amount of clearance between the side walls of the shearing members so that the inner member is free to float transversely and, while this mitigates the difficulty above discussed, it is responsible for another serious difficulty, viz.,—it causes the implement to pull to the greater discomfort of the user. This occurs because hairs sometimes find their way into the side clearance space between the shearing members and then, when transverse displacement of the inner member occurs, these hairs are pinched and therefore pulled as the implement is moved across the face of the user. It is these detrimental characteristics found in dry-shaving implements as heretofore constructed which are eliminated by the present invention.

To this end an important feature of my invention consists in an outer shearing member having spaced side walls and transverse shearing teeth extending between them, in combination with an inner member having co-operating transverse shearing teeth and means for guiding the inner member in a path out of contact with the side walls of the outer member. In other words, it is proposed to transfer the guiding function of the side walls of the outer member to independent guiding means thus permitting a substantial and uniform clearance to be maintained at all times between the shearing members except in the shearing plane or zone. The clearance space between the sides of the shaving members may thus be of such ample proportions as to prevent accumulation of shaving debris and such as to prevent the pinching of hairs between the two members under any circumstances. Moreover, the guiding means may well be designed to prevent lateral displacement of the inner shearing member so that a moderate clearance space may be safely relied upon without danger of pulling.

The exact shape and location of the guiding means is of secondary importance although as herein shown and in accordance with another feature of the invention I prefer to locate it upon the inner side of the transverse shearing teeth of the outer shear member, since then it may be utilized also as a reinforcement for the outer shearing teeth. For close shaving these teeth should be made as thin as possible and reduction in thickness is facilitated by reinforcing them in the manner herein shown.

Still another feature of the invention contributing to the efficiency of the implement and to ease and accuracy of its construction consists in guiding means comprising a series of downwardly tapering projections upon the transverse shearing teeth of the outer member which projections form collectively a longitudinal guide and which are received in a corresponding V-shaped groove in the inner shearing member. The inner shearing member may thus be Y-shaped in cross-section and ample clearance space thus provided beneath the branches of the inner shearing member for the reception of shaving debris without any tendency to clog the device.

These and other features of the invention will be best understood and appreciated from the following description of a preferred embodiment thereof, selected for purposes of illustration and shown in the accompanying drawing, in which.

Figure 1:
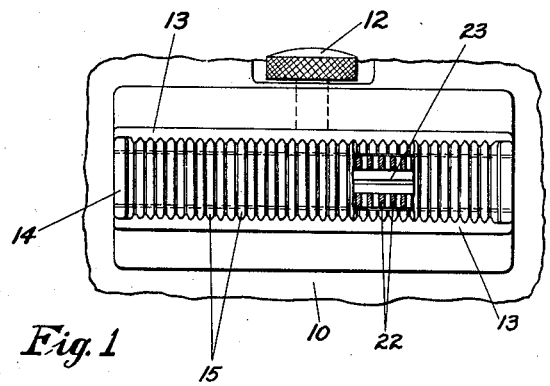
Fig. 1 is an end or plan view of the implement on an enlarged scale, portions of the casing being shown as broken away.
Figure 2:
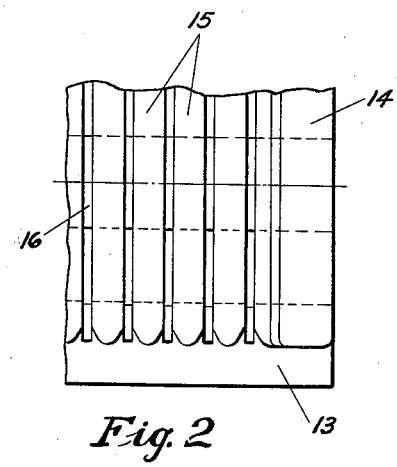
Fig. 2 is a similar fragmentary view on a greatly enlarged scale.
Figure 3:
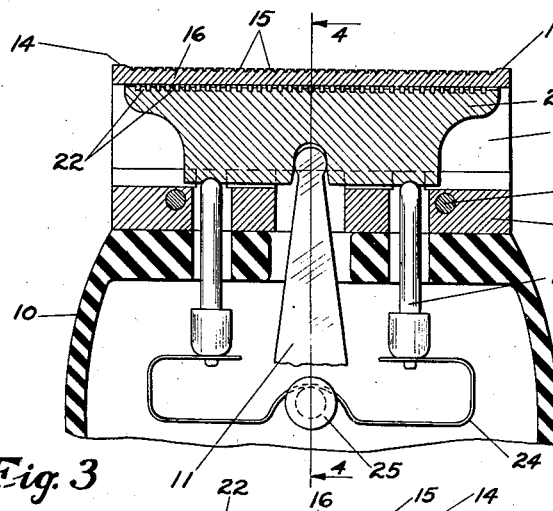
Fig. 3 is a view in longitudinal section corresponding to Fig. 1.
Figure 4:
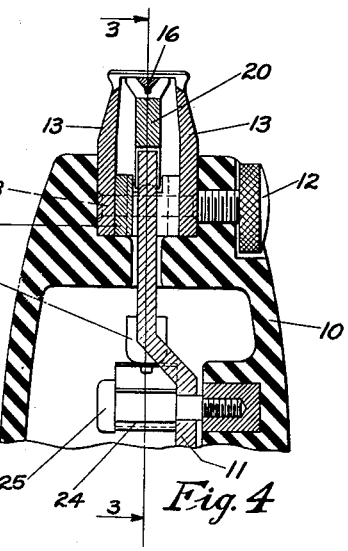
Fig. 4 is a similar view in cross-section.
Figure 5:
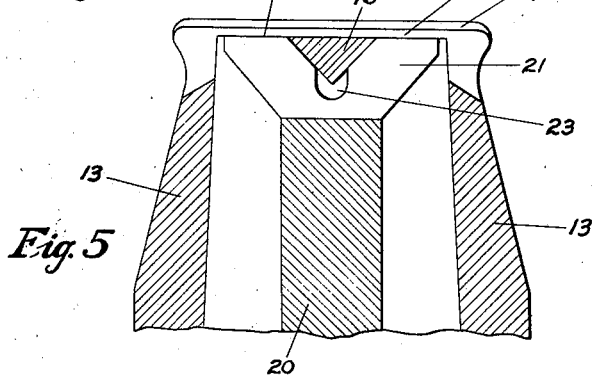
Fig. 5 is a fragmentary view in cross-section on a greatly enlarged scale.

The implement includes in its organization an elongated casing 10 of moulded material, such as "Bakelite", shaped to serve as a handle and also as a housing for a small motor and actuating mechanism by which the emplement is operated. The casing 10 is formed at its upper end with spaced flanges to receive the metallic head of the implement, one of these flanges being drilled and threaded to receive a transverse clamping screw 12. The outer member of the head has two similar side portions 13 spaced at their lower edges and connected at their upper edges at each end of the implement by relatively thick bridges 14. Between the bridges extends a thin intermediate plate presenting a flat face-engaging area and slotted to present transverse shearing teeth 15 and supported by a downwardly projecting rib 16 which is V-shaped in cross-section. It will be understood that the intermediate plate has straight uninterrupted slots extending from side to side to form the shearing teeth 15, the slots extending downwardly a substantial distance below the upper edges of the side portions 13 as shown in Figs. 4 and 5. However, the V-shaped rib 16, which is integral with the transverse teeth 15, is not slotted but extends from one end of the implement to the other between the bridges 14 and beneath the shearing teeth 15. It will be seen that the rib 16 thus acts effectively to support and reinforce the shearing teeth 15 so that the latter may be reduced very substantially in thickness without danger of bending. At the same time the fact that the slots extend without interruption through the material above the rib 16 also contributes to close shaving by permitting the skin to bulge downwardly into the slots throughout the whole central area of the skin-engaging face of the implement.

The outer member is completed and made a rigid substantially rectangular frame by a spacer bar 17 which is inserted between the lower edge of its side portions 13 and secured in place by rivets 18. The bar 17 is cut out at its center and at two intermediate places to receive the operating lever 11 and holding device 26 for the inner shearing member as will be presently described.

The inner shearing member or cutter is of slightly less length than the outer member and is Y-shaped in cross-section. The body 20 of the inner member is undercut at each end while its Y-shaped head 21 is co-extensive in length with the shearing teeth 15 of the outer member. The ends of the inner member thus overhang open space within the body of the head. The head 21 is transversely slotted to form two parallel series of transverse shearing teeth 22 and it is provided with an intermediate V-shaped groove accurately fitting the rib 16. This groove terminates in a rounded longitudinal channel 23 which affords clearance for the apex of the rib 16. The shearing teeth 22 are spaced similarly to the shearing teeth 15 of the outer member and are arranged in two series one on either side of the rib 16 and underlie the shearing teeth 15. The slots forming the teeth 22 are of sufficient depth to extend from side to side beneath the rib 16 thus forming transverse passages connecting the space between the shearing teeth. At its outer side edges the Y-shaped head 21 is squared off so that there are afforded definite clearance spaces between the sides of the movable head 21 and the inner stationary walls of the side portions 13. As best shown in Fig. 5 enlarged clearance spaces are provided at each side of the body portion 20 of the inner member beneath the branches of the head 21.

The inner member 20 is reciprocated longitudinally by the oscillating lever 11 which in turn is operated by the motor, not shown. As already stated the lever 11 extends upwardly through the upper end of the casing, through an opening in the spacer bar 17 and into a curved notch in the lower face of the body 20 of the inner member. The lever 11 is offset to permit a leaf-spring 24 to be located within the casing directly beneath the inner member. This spring is supported upon a transverse stud 25 carried by the lever 11. At each end it is connected to a vertically extending strut 26 and these are thus forced upwardly against the inner member and maintain it always with the upper surface of its shearing teeth 22 in direct contact with the lower surface of the outer shearing teeth 15.

It will be apparent that the inner member is positively guided in its reciprocation by the V-shaped rib 16 entirely independently of the side walls of the outer member. Its path is thus positively controlled without appreciable side play so that the principal cause of pulling in dry-shaving implements is obviated. Moreover, the chambers or passages formed or provided beneath the diverging branches of the inner member are ample to receive all the shaving debris produced in the use of the implement and permit the free passages of the same away from the shearing plane and into portions of the implement where it may be readily discharged through either end without any tendency to clog or cause displacement of the inner member or separation of the shearing surfaces. Uniform and efficient shaving of the implement, as well as comfort of the user, is thus insured throughout a long period of use.

Having thus disclosed my invention and described a preferred embodiment thereof for purposes of illustration but not by way of limitation, I claim as new and desire to secure by Letters Patent:

1. A dry shaving implement comprising an outer member having side walls connected by transverse shearing teeth and a depending V-shaped longitudinal guide bar disposed beneath them, and a movable cutter having a Y-shaped head embracing said guide bar and being slotted to a depth below the guide bar to provide connected series of teeth on both sides thereof.

2. A dry shaving implement comprising an outer member having side walls connected by transverse shearing teeth, a depending longitudinal guide rib disposed beneath the teeth, and a movable cutter having spaced branches presenting two series of shearing teeth having their spaces connected by passages extending transversely beneath the guide rib.

3. A dry shaving implement comprising an outer member having a flat skin-engaging face with slots extended completely across its face forming transverse shearing teeth and permitting the skin to bulge into the slots throughout the whole central area of the implement, a depending longitudinal guide rib disposed beneath the teeth, and a movable cutter having spaced branches presenting two series of shearing teeth having their spaces connected by passages extending transversely beneath the guide rib.

JOSEPH MUROS.